June 14, 1955 N. B. MEARS 2,710,814
METHOD FOR PRODUCING LIGHT-SENSITIVE
COATING ON METAL WEBS
Original Filed April 19, 1951 5 Sheets-Sheet 1
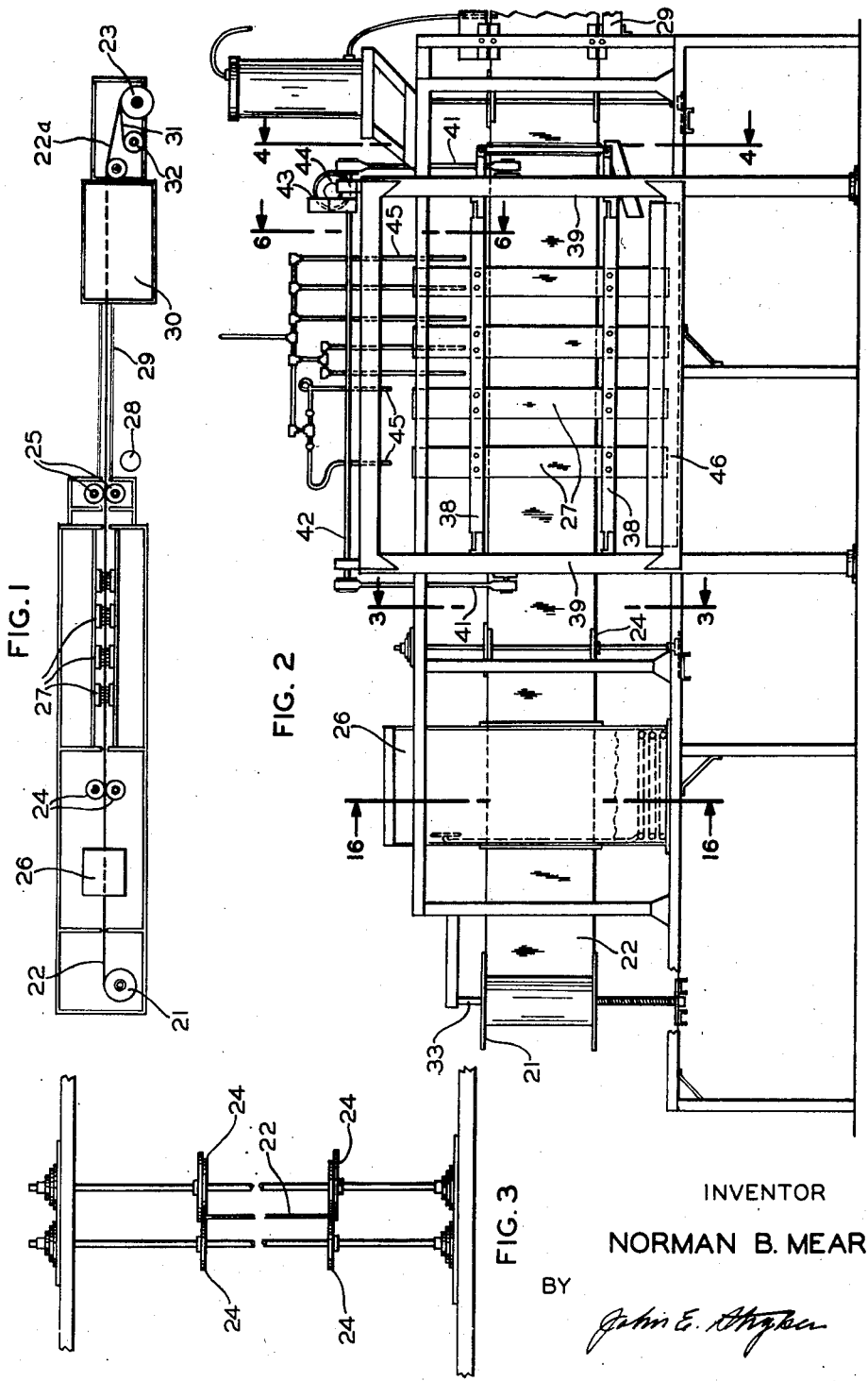
INVENTOR
NORMAN B. MEARS
BY
ATTORNEY June 14, 1955 N. B. MEARS 2,710,814
METHOD FOR PRODUCING LIGHT-SENSITIVE
COATING ON METAL WEBS
Original Filed April 19, 1951 5 Sheets-Sheet 2

INVENTOR
NORMAN B. MEARS
BY
*John E. Stryker*
ATTORNEY

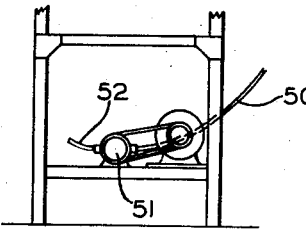
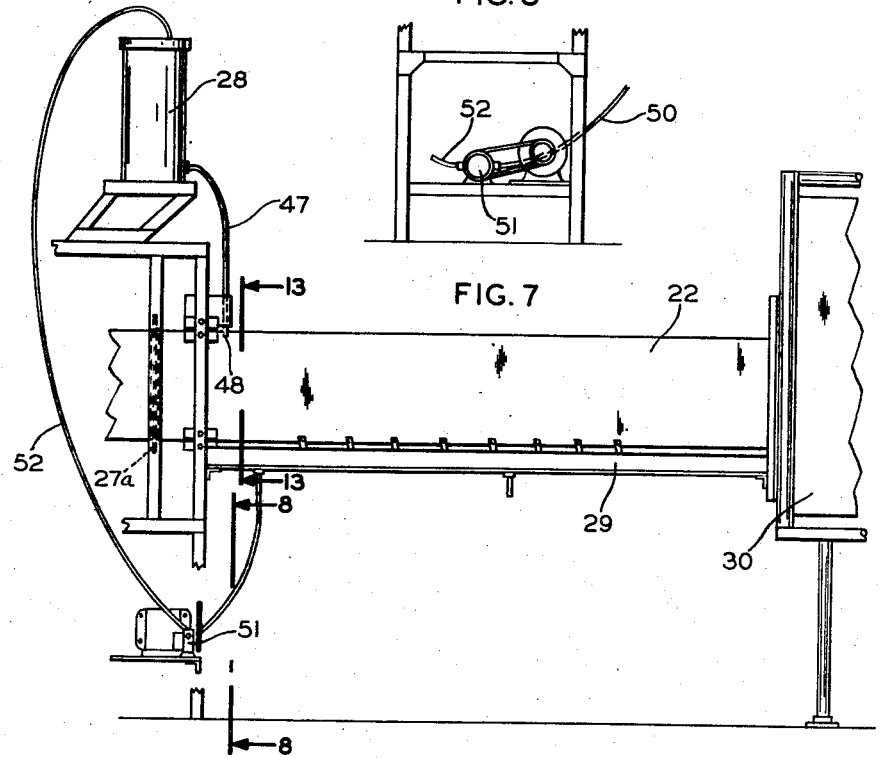
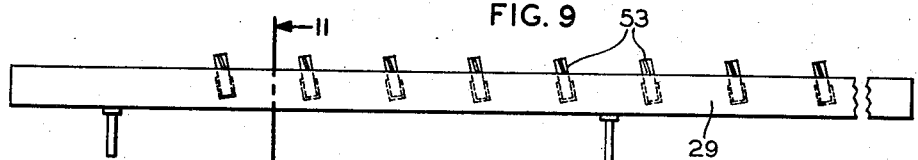
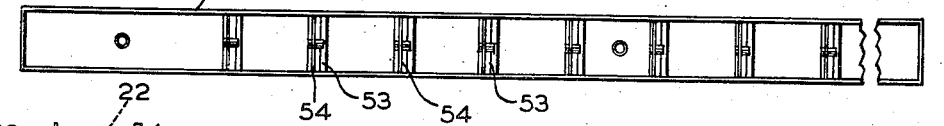
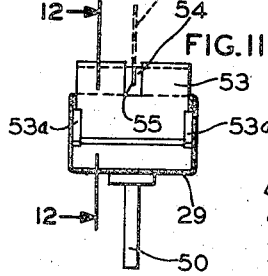
INVENTOR
NORMAN B. MEARS
ATTORNEY June 14, 1955
N. B. MEARS
2,710,814
METHOD FOR PRODUCING LIGHT-SENSITIVE COATING ON METAL WEBS
Original Filed April 19, 1951
5 Sheets-Sheet 4
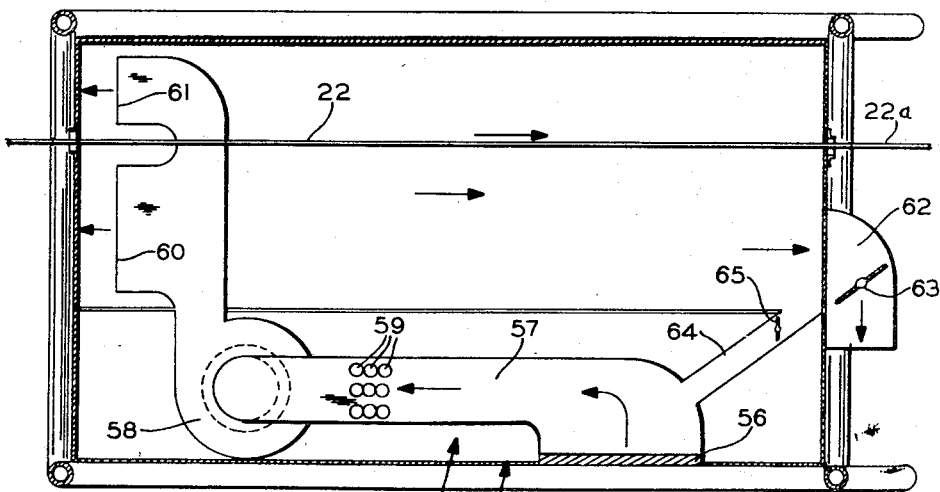
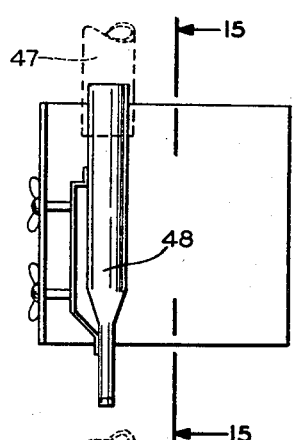
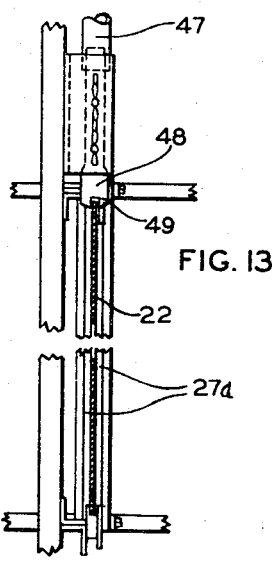
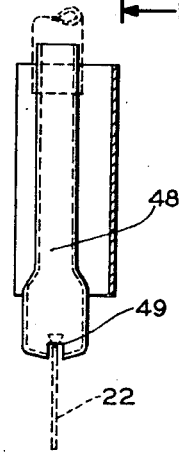
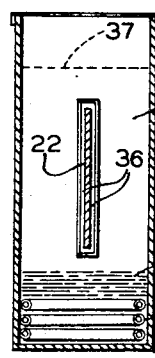
INVENTOR
NORMAN B. MEARS
BY
*John E. Stryker*
ATTORNEY

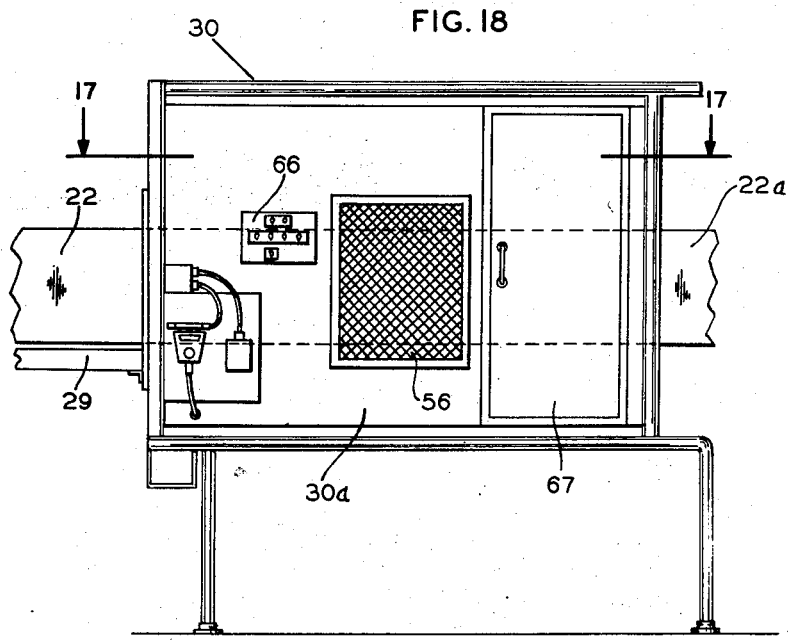
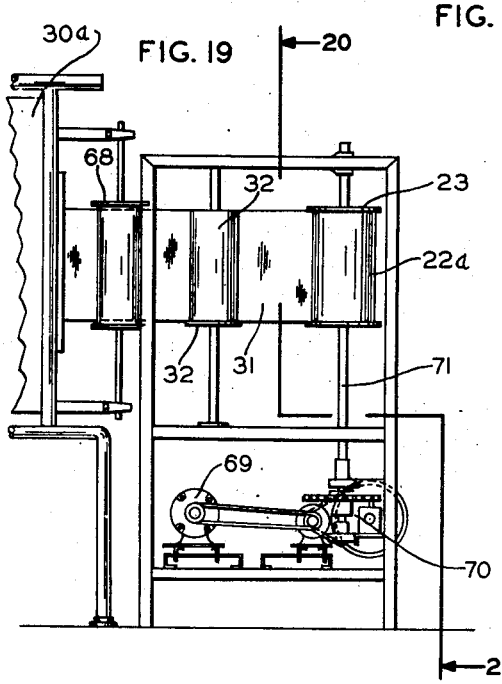
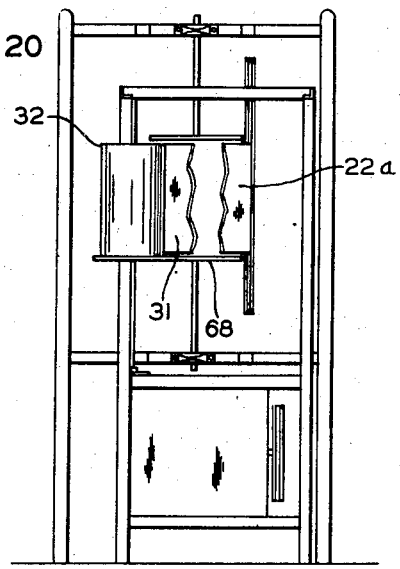

United States Patent Office 2,710,814
Patented June 14, 1955

2,710,814

METHOD FOR PRODUCING LIGHT-SENSITIVE COATINGS ON METAL WEBS

Norman B. Mears, West St. Paul, Minn., assignor to Buckbee-Mears Company, St. Paul, Minn., a corporation of Minnesota Original application April 19, 1951, Serial No. 221,904. Divided and this application May 24, 1952, Serial No. 290,511

5 Claims. (Cl. 117—34)

In the manufacture of various articles of precision from thin metal blanks, sheets or webs requiring photographic reproduction of a pattern or design on the work, a large amount of hand work and time has heretofore been required in the preparation, coating and drying of the work preparatory to the photo-printing of the required design on the sensitized surface or surfaces. The present invention relates to an improved machine and method for performing such preliminary operations, including the coating and drying of the work.

It is an object of my invention to provide a machine which operates automatically to prepare the surfaces of thin metal webs and apply a uniform light-sensitive coating thereto whereby the cost of the coated product is reduced and a uniform, continuous coating of high quality is obtained.

A particular object is to provide a machine of the class described which is adapted to receive the web to be coated from a spool or reel and to move the web continuously along a determined path in such position as to expose one or both faces of the web for treatment in combination with devices positioned along the path of travel of the web for cleaning and scrubbing both faces or a selected face thereof and to form fine toothed surfaces thereon, then coating such surface or surfaces with a liquid light-sensitive material, then drying the coating material and finally winding the coated, dry web on a spool or reel from which it may be readily withdrawn for further treatment.

A further object is to provide an improved method for uniformly coating a thin, flexible metal web with a light sensitive material while moving the web continuously along a determined path and in a vertical plane, the method including the steps of delivering the coating in a liquid state to the upper edge of the web so that the liquid is caused to flow over both faces or a selected surface of the web, allowing the excess coating material to drain from the lower edge while removing accumulations of the coating from the lower longitudinal margin and thereafter drying the coating.

Among the articles of manufacture which may be improved and reduced in cost by the use of the present invention are apertured masks for television tubes, fine screens for mechanical separation of solid particles, reticles for fire control and sighting instruments and other articles requiring precise location of minute perforations in thin metal blanks. For such articles the metal web or sheet is less than .02 inch thick and is usually within the range .001 to .006 inch thick. Pure metals, e. g., copper, silver, nickel or tin are best suited for accurately controlled etching treatment and the web should be of uniform thickness. Thin webs of this character are difficult to handle because of their malleability, flexibility and general tendency to become locally deformed as by wrinkles, creases and other indentations which destroy the accuracy and utility of the product. By the present invention such detrimental deformations are eliminated and important economies in the quantity production of coated webs of any required width are obtained.

Referring to the accompanying drawings which illustrate my improved machine and method by way of example and not for the purpose of limitation:

Figure 1 is a diagrammatic plan view of the machine;

Fig. 2 is a side elevational view showing the portions of the machine extending from the feed roll to the coating mechanism and including the cleansing and scouring mechanism;

Fig. 3 is a fragmentary cross sectional view taken on the line 3—3 of Fig. 2;

Fig. 7 is a side elevational view showing the coating mechanism;

Fig. 8 is a fragmentary cross sectional view taken approximately on the line 8—8 of Fig. 7;

Figs. 9 and 10 are side elevational and plan views respectively of the drain trough and associated devices for removing the excess coating;

Fig. 11 is a cross section taken on the line 11—11 of Fig. 9;

Fig. 12 is a fragmentary section taken on the line 12—12 of Fig. 11;

Fig. 13 is a section taken approximately on the line 13—13 of Fig. 7;

Fig. 14 is a detail side elevational view showing the nozzle for delivering the coating liquid to the web and the support therefor;

Fig. 15 is a section taken on the line 15—15 of Fig. 14;

Fig. 16 is a cross section taken through the degreasing chamber approximately on the line 16—16 of Fig. 2;

Fig. 17 is a diagrammatic horizontal sectional view through the drier taken on the line 17—17 of Fig. 18;

Fig. 18 is a side elevational view of the drier;

Fig. 19 is a side elevational view showing the power-driven reel at the delivery end of the machine and associated mechanism, and Fig. 20 is a cross sectional view taken approximately on the line 20—20 of Fig. 19.

Figure 4:
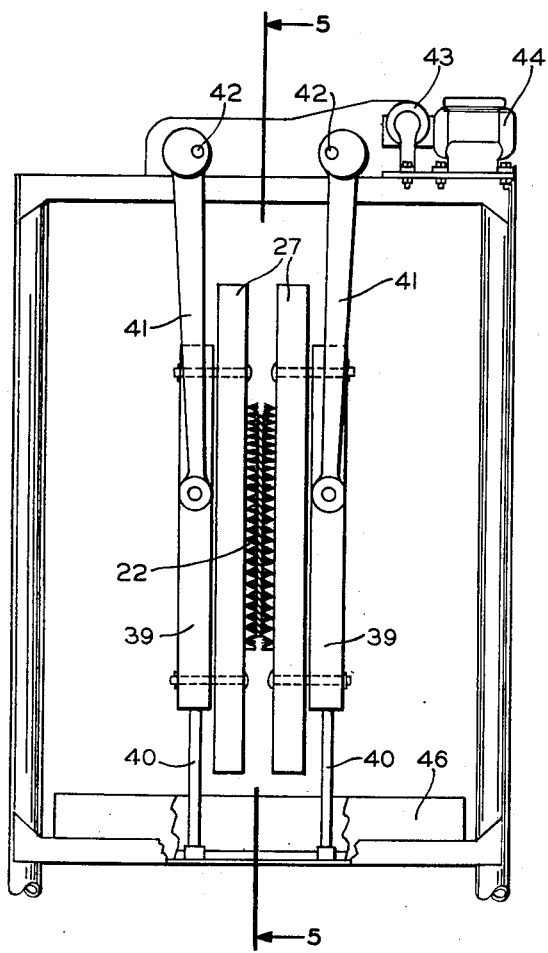
Fig. 4 is a fragmentary cross sectional view taken on the line 4—4 of Fig. 2.

Referring to the diagrammatic illustration of the machine and method shown in Fig. 1, the numeral 21 indicates a reel or spool from which a metal web 22 to be coated is continuously drawn. This web preferably extends in a vertical plane from the reel 21 to a power-driven reel 23 at the opposite end of the machine so that the longitudinal edges of the web extend horizontally, one above the other. Between the reels 21 and 23 the web 22 is supported in its upright position between pairs of rollers 24 and 25 which grip and confine the upper and lower margins of the web, leaving both faces thereof exposed for treatment. As it is withdrawn from the reel 21, the web 22 is first given a degreasing treatment in a chamber 26. This chamber may contain a gas such as trichlorethylene which reacts with any grease or oil that may be carried by the surface of the web to facilitate the subsequent thorough cleansing of the surfaces or the degreasing agent may be applied in the form of a spray or by brushing it on the surfaces to be cleansed.

After passing out of the degreasing chamber 26, the web 22 is supported by pairs of the rollers 24 and then passes through a cleansing section of the machine wherein pairs of brushes 27 are operated in engagement with opposite faces of the web while water and a suitable detergent and a fine abrasive material are applied to the web. After thorough scouring and rinsing in the cleansing section of the machine the web passes to and through a coating and drainage section wherein a suitable light sensitive coating material is caused to flow over the faces of the web from a reservoir 28 and the excess liquid is recovered in a trough 29 extending along the lower edge of the web. From the coating section the web passes through a drier 30 in which filtered and heated air is directed over the coated surfaces to be dried. Finally the coated and dried web 22a passes to a reel 23 upon which it is wound, together with a protective web of paper 31 which is drawn from a roll 32 so that a continuous web of paper is interposed between successive convolutions of the web 22a on the reel 23.

Degreasing

As shown in Fig. 2, the reel 21 is mounted on a vertical spindle 33 having suitable bearings in the frame of the machine. The degreasing chamber 26 (Figs. 2 and 16) may comprise a tank containing a liquid 34 such as trichlorethylene which may be applied in any suitable manner to the surfaces of the metal, e. g., by brushing, spraying, or as a gas. Since the degreasing agent boils at 180° F. to form a heavy gas it may be heated by a heating coil 35 in the bottom of the tank. The web 22 to be coated enters and leaves the chamber 26 through suitable vertically elongated slots therein and the slots are sealed by flexible members 36 engaging opposite faces of the web 22 in order to prevent the escape of the toxic gas.

Cleansing

Figure 5:
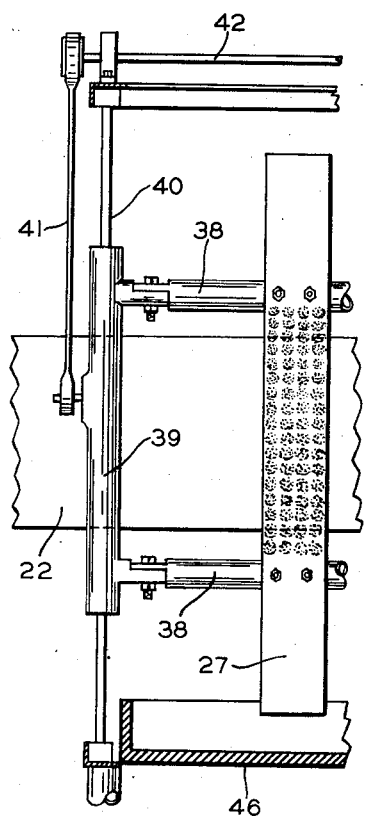
Fig. 5 is a fragmentary section taken on the line 5—5 of Fig. 5.
Figure 6:
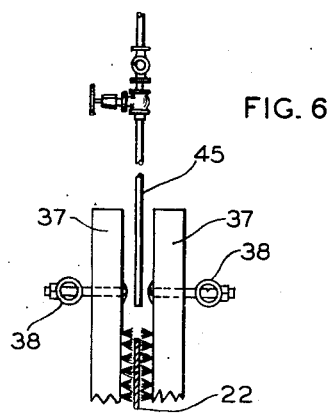
Fig. 6 is a fragmentary section taken on the line 6—6 of Fig. 2.

From the degreaser the web 22 passes between pairs of the brushes 27 which are supported on pairs of horizontally extending bars 38, as best shown in Figs. 2, 4, 5 and 6. The bars 38 are supported for vertical reciprocating movement, being connected at each end to vertically elongated slide members 39, each slidable along a vertical guide rod 40. Each of the members 39 is operatively connected to an arm 41 having an eccentric connection with a horizontal drive shaft 42. A pair of the shafts 42 extend along the top of the supporting frame and are operatively connected through suitable speed reducing mechanism in a housing 43 to an electric motor 44. Thus when the machine is in operation the motor 44 through its connections with the brushes 27, causes these brushes to be given reciprocating movement with the bristles of the brushes at opposite faces of the web 22 in contact therewith.

Water is supplied and caused to flow downward between each pair of brushes and over the surfaces of the web 22 from a series of pipes 45. A detergent, preferably including a fine abrasive material, is also supplied to the web between certain of the brushes 27 toward the receiving end of the cleansing section and clear wash water is then supplied as a spray to the web and brushes near the delivery end of this section. As a result of the treatment in the cleansing section of the machine, the web 22 is thoroughly cleaned and given a fine grained burr surface best suited to the adherence of the light sensitive coating subsequently applied in the machine. The used washing fluid, detergent and abrasive material flows from the lower edge of the web 22 and lower ends of the brushes 27 into a pan 46 and thence to waste. Soft rubber wipers or squeegees 27a (Figs. 7 and 13) are arranged to remove excess wash water from the web 22 as it passes to the coating section.

Coating

Referring particularly to Figs. 7–15 inclusive, a suitable cold top or hot top enamel, e. g., a glue top enamel, in liquid state is fed from the overhead tank 28 through a tube 47 to a nozzle 48 disposed to discharge a stream of the liquid upon the upper edge of the web 22 as the latter is advanced at a predetermined rate of speed. As best shown in Figs. 14 and 15, the nozzle 48 is formed with an aperture 49 at its lower end adapted to receive the upper margin of the web 22 and to direct the coating liquid over both faces of the web. The coating fluid is thus caused to cover both faces of the web and the excess drains from the lower edge into the elongated trough 29. Accumulations of the liquid in this trough are withdrawn through a tube 50 and are returned by a motor-driven pump 51 (Figs. 7 and 8) and tube 52 to the tank 28.

Spaced along the trough 29 are a plurality of wiping devices 53 in the nature of squeegees which engage both faces of the lower margin of the web 22 to positively remove the excess of the liquid which tends to adhere and accumulate along the lower margin. As shown in detail in Figs. 11 and 12, each of the wiping devices 53 is provided with a flexible elastic blade 54, preferably constructed from rubber or rubber-like material, and formed with a vertical slot 55 extending to the upper edge of the blade to receive the lower margin of the web 22. As the lower margin of the web moves along in the slots 55, accumulations of the coating material are positively removed by the several blades 54 from which the excess liquid passes by gravity into the trough 29. The blocks supporting the blades 54 are readily removable from U-shaped holders 53a fixed on the side walls of the trough 29.

Any of a number of commercially available or suitable light sensitive enamels may be employed as the coating material. For example, a hot top solution of glue and ammonium bichromate has been used with excellent results. When dry it forms a sufficiently durable coating and is sufficiently stable to permit storage of the rolls of coated metal for periods of a number of weeks when it is convenient or desirable to defer the photo-printing for such periods.

Drying

When the web 22 reaches the delivery end of the coating section, the light sensitive coating is in a tacky, non-fluid condition ready for drying and the web passes into the drying chamber indicated generally by the numeral 30. Since details of the dryer are not claimed herein, they are merely illustrated diagrammatically. As best shown in Figs. 17 and 18, the dryer has a generally rectangular casing 30a which is formed with an inlet opening for air covered by a suitable filter 56 through which the air is drawn into a conduit 57 within the casing. This conduit extends to the intake of a power-driven centrifugal fan 58 and the air is heated by a multiplicity of electrical heating elements 59 located in the conduit 57. The heated air is blown from outlets 60 and 61 located at one end of the heating chamber so that the air is caused to pass along opposite surfaces of the web 22 during its passage through the chamber. From the opposite end of the drying chamber the air may be discharged through a conduit 62 to atmosphere under control of a damper 63 and a portion of the air may be returned to the conduit 57 through a branch conduit 64 under control of a damper 65. Suitable controls for the fan motor and heating elements are indicated at 66, on the exterior of the dryer, which is also provided with an instrument indicating the temperature within the heating chamber and an access door 67. Upon emerging from the drying chamber the light-sensitive coating on the web 22a is sufficiently hard and dry to permit the winding of the web on the reel 23.

Winding mechanism

As shown in Figs. 19 and 20, the web 22a, as it emerges from the dryer 30, passes partly around a guide roller 68 and thence to the periphery of the reel 23. This reel is continuously rotated at a predetermined controlled speed through suitable connections with an electric motor 69, including speed reducing mechanism 70 and a friction drive connection with a vertical shaft 71 on which the reel 23 is fixed. In order to protect the sensitized surfaces of the coated web, the web 31 of paper or other suitable material is continuously drawn from a roll 32 and is wound between convolutions of the web 22a on the reel 23.

In order to obtain the desired smooth uniform coating on the web it is important to allow time for the excess liquid coating to drain from the web surfaces, with the aid of the wiper devices 53, and also time for the light-sensitive material remaining on the web to become tacky and non-fluid before the web passes into the dryer 30 where the accelerated, final stage of drying takes place. The time required for the preliminary drying at room temperature is, of course, dependent upon the liquid solvent content of the coating material and the room temperature and humidity. The rate of travel of the web is adjusted to compensate for the atmospheric conditions and liquid content of the coating material and so that the required preliminary drying will take place during the travel of any given point on the web from the coating nozzle 48 to the drying chamber 30. It has been found that in the production of television masks for which webs of widths within the range 6 inches to 30 inches and where a hot top enamel such as that hereinbefore described is employed, a suitable rate of travel of the web is between one and two feet per minute and that the drainage and preliminary drying at room temperature should be continued for a period of from 3 to 6 minutes, depending on atmospheric conditions.

Sufficient tension to retain the web in its vertical position and out of contact with the adjacent machine parts as it passes along the coating and drying sections of the machine is created by the friction or drag of the scrubbing and cleaning devices and by the turning of the feed reel 21 on its support. Care is thus taken to avoid contact with the coated surfaces of the web until after they have been thoroughly dried.

The present application is a division of my application Serial No. 221,904, filed April 19, 1951, for Machine and Method for Producing Light-Sensitive Coatings on Metal Webs.

Having described my invention, what I claim as new and desire to protect by Letters Patent is:

1. The method of coating a thin metal web which comprises, continuously moving said web along a determined path in a substantially vertical plane with one longitudinal edge above the other longitudinal edge while successively cleansing a surface thereof, then delivering a stream of liquid light-sensitive enamel to said surface solely along the upper margin thereof whereby said surface is coated by flow of the liquid enamel crosswise of the direction of movement of the web along said path and then drying the coating.

2. The method of coating a thin metal web which comprises, continuously moving said web along a determined path and in a substantially vertical plane with one longitudinal edge above the other longitudinal edge while successively cleansing the surfaces thereof, removing the excess cleaning material from the web, then delivering a liquid light-sensitive material as a stream solely upon and along the upper margins of the cleansed surfaces while draining the excess liquid from the lower margins thereof, drying the resulting coated surfaces and winding the coated and dried web in the form of a roll.

3. The method of coating a thin metal web which comprises, continuously moving said web along a determined path in a substantially vertical plane with one longitudinal edge above the other longitudinal edge, delivering a stream of liquid light-sensitive material solely upon zones extending along the upper edge of said web to thereby coat the surfaces of the web while draining and removing the excess coating liquid from the lower edge of the web for a period of time sufficient to allow the coating to become tacky and non-fluid and then drying the coating.

4. The method in accordance with claim 3 wherein the removal of the excess coating liquid from the lower edge of the web is effected by positive wiping of a relatively narrow marginal area of the web adjacent to the lower edge thereof.

5. The method in accordance with claim 3 wherein the web is maintained under longitudinal tension sufficient to retain a major portion of the coated web in self-supporting spaced relation to all elements of the coating and drying apparatus.

References Cited in the file of this patent

UNITED STATES PATENTS

| Number | Name | Date |
|---|---|---|
| 415,566 | Rowell | Nov. 19, 1889 |
| 2,021,485 | Huebner | Nov. 19, 1935 |
| 2,235,978 | Braucher | Mar. 25, 1941 |
| 2,279,686 | Kerlin | Apr. 14, 1942 |
| 2,469,123 | Martin | May 3, 1949 |